United States Patent [19]
Tewinkle et al.

[11] Patent Number: 6,014,160
[45] Date of Patent: Jan. 11, 2000

[54] IMAGE SCANNING ARRAY HAVING INDEPENDENTLY ADDRESSABLE PHOTOSENSOR CHIPS

[75] Inventors: Scott L. Tewinkle, Ontario; Paul A. Hosier, Rochester; Jagdish C. Tandon, Fairport, all of N.Y.

[73] Assignee: Xerox Corporation, Stamford, Conn.

[21] Appl. No.: 09/050,272

[22] Filed: Mar. 30, 1998

[51] Int. Cl.[7] .................................................. H04N 1/19
[52] U.S. Cl. .......................... 347/247; 347/237; 347/257; 358/514; 358/482; 358/483
[58] Field of Search .................................. 347/237, 247, 347/257; 358/500, 474, 482, 483, 514

[56] References Cited

U.S. PATENT DOCUMENTS

| | | | |
|---|---|---|---|
| 4,567,529 | 1/1986 | Yamaguchi et al. | 358/482 |
| 4,691,114 | 9/1987 | Hasegawa et al. | 358/474 |
| 4,737,854 | 4/1988 | Tandon et al. | 358/213.31 |
| 5,003,380 | 3/1991 | Hirota | 358/500 |
| 5,528,272 | 6/1996 | Quinn et al. | 347/42 |

*Primary Examiner*—N. Le
*Assistant Examiner*—Hai C. Pham
*Attorney, Agent, or Firm*—Robert Hutter

[57] ABSTRACT

An image sensor array includes a plurality of photosensor chips, which are butted end-to-end to form a single linear array of photosensors. Each individual chip in the array is provided with an independently-addressable output enable line and video output line. This configuration allows individual chips to be addressed to output image data at specific times and in a specific manner suitable for any kind of downstream circuitry.

10 Claims, 4 Drawing Sheets

FIG. 5
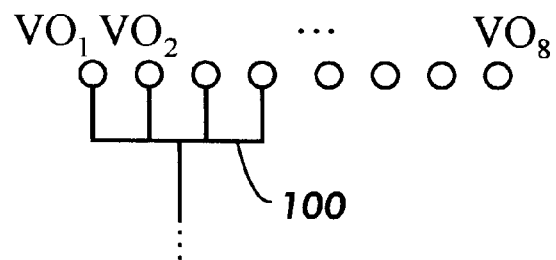
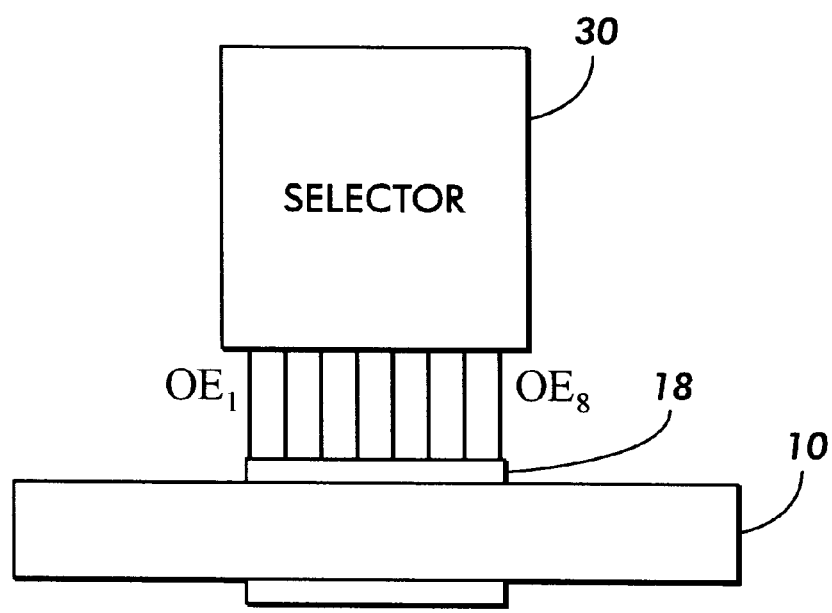
FIG. 6

IMAGE SCANNING ARRAY HAVING INDEPENDENTLY ADDRESSABLE PHOTOSENSOR CHIPS

FIELD OF THE INVENTION

The present invention relates to scanning arrays in which a set of photosensors are arranged in a linear array, such as for scanning of hard copy images for conversion to digital data. More specifically, the present invention relates to scanning arrays in which a plurality of silicon chips are butted to form a single linear array of photosensors.

BACKGROUND OF THE INVENTION

Image sensor arrays typically comprise a linear array of photosensors which raster scan an image-bearing document and convert the microscopic image areas viewed by each photosensor to video image signals. Following an integration period, the image signal charges formed on the photosensors are amplified and transferred as analog video signals to a common output line or bus through successively actuated multiplexing transistors.

For high-performance image sensor arrays, a preferred design includes an array of photosensors of a width comparable to the width of a page being scanned, to permit imaging generally without the use of reductive optics. In order to provide such a "full-width" array, however, relatively large silicon structures must be used to define the large number of photosensors. A preferred technique to create such a large array is to make the array out of several butted silicon chips. In one design, an array is intended to be made of 20 silicon chips, butted end-to-end, each chip having 248 active photosensors spaced at 400 photosensors per inch. Typically, the chips which are butted to form the array are formed in a silicon wafer, which is then "diced" into a number of chips, which are individually tested and then arranged into a bar shape.

In a sensor array of this design, each of the 20 chips is a separate integrated circuit. Typically, each chip has its own individual video output, for the downloading of image signals ultimately from the photosensors on that particular chip. When an image is being scanned, video signals are output from each chip at a very high rate as the original hard-copy image moves past the linear array of photosensors on the chip. Thus, if the intended resolution of the chip in a bar is 400 spots per inch, a line of video data must be output from the chip every time the original image moves ¹⁄₄₀₀th of an inch. For this reason, in a bar with up to 20 chips, high-speed handling of the resulting video data becomes an important design consideration for downstream circuitry.

A key factor in designing circuitry downstream of such an image sensor array is how many parallel channels of digital data the circuitry is designed to accept. The outputs of many chips can be coordinated to output their video signals on to a single video line for all chips; conversely a large number of chips can each simultaneously output their video data in parallel. Of course, other designs may compromise between series and parallel outputs, such as combining the outputs of 20 chips into 2, 4, or 10 output lines. In general, the larger the number of chips grouped into a single output channel, the slower the maximum possible scan rate for the array. Conversely, the smaller the number of chips grouped into one output channel, the higher the maximum possible scan rate. Of course, whether the output is highly parallel or highly in series may introduce costs to the design, either in hardware or in performance. Therefore, it is desirable to provide an image sensor bar which can be electronically configured, so that a bar of a single design can be made to output as few or as many parallel channels as needed.

DESCRIPTION OF THE PRIOR ART

U.S. Pat. No. 4,737,854 discloses a basic design of a CMOS-type image sensor array in which a number of chips are butted together to form a single linear array. In this design, each chip includes a linear array of photosensors, each photosensor leading into a two-stage transfer circuit, the transfer circuits in turn selectively outputting signals thereon to a single video output line.

U.S. Pat. No. 5,528,272 discloses the general design of an image sensor array in which a large number of image sensor chips are butted to form a single array and mounted on a substrate. The substrate includes printed circuitry thereon, which connects the various chips to a central socket.

SUMMARY OF THE INVENTION

According to one aspect of the present invention, there is provided an image sensor bar comprising a plurality of photosensor chips, each photosensor chip including a linear array of photosensors, the photosensor chips being mounted on the image sensor whereby the linear arrays of the plurality of chips are aligned to form a single linear array. Each photosensor chip includes an output enable line and a video out line, activation of the output enable line causing the chip to output image signals on the video out line. There is further provided a first socket, the video out line for each photosensor chip being connected directly to the first socket.

According to another aspect of the present invention, there is provided an image sensor comprising a plurality of photosensor chips, each photosensor chip including a linear array of photosensors, the photosensor chips being mounted on the image sensor whereby the linear arrays of the plurality of chips are aligned to form a single linear array. Each photosensor chip includes an output enable line and a video out line, activation of the output enable line causing the chip to output image signals on the video out line. A selector is directly connected to the output enable line of each photosensor chip, and is capable of activating the output enable line of a photosensor chip independently of activating the output enable line of any other photosensor chip.

According to another aspect of the present invention, there is provided an image sensor, comprising a photosensor and an output line for outputting an image signal derived from light impinging on the photosensor. A pull-down enable line is actuatable to selectably cause the output line to float.

BRIEF DESCRIPTION OF THE DRAWINGS

FIGS. 3–5 are examples of output channel configurations for downstream circuitry relative to the sensor bar of the present invention;

FIG. 6 shows the interaction of a digital selector with the "output enable" lines of a bar according to the present invention;

DETAILED DESCRIPTION OF THE INVENTION

Figure 1:
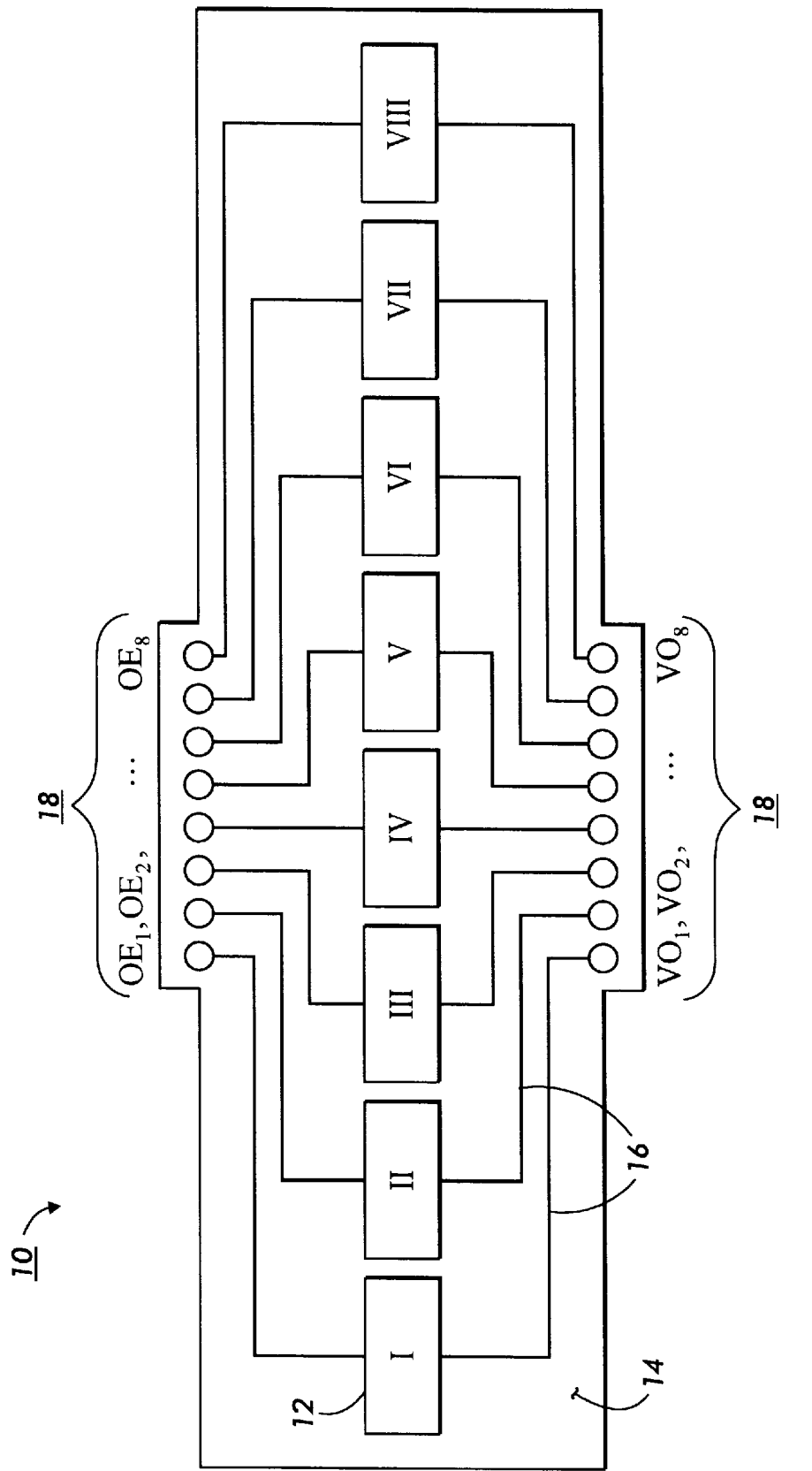
FIG. 1 is a plan view of a sensor bar, including a plurality of butted photosensor chips, according to one aspect of the present invention.

FIG. 1 is a plan view of an image sensor bar according to the present invention. The bar, generally indicated as 10, includes a plurality of image sensor array chips 12 which are butted end-to-end so that the arrays of photosensors on each chip (not shown in FIG. 1) together form a single linear array of photosensors. The chips 12 are mounted on a substrate 14. In FIG. 1, for purposes of clarity, the individual chips forming the butted array are given roman numerals I–VIII. As further can be seen in the Figure, each chip 12 includes at least two particular connections, an "output enable" connection OE, and a "video out" connection VO. As shown in the Figure, for example, the chip marked I connects to an output enable line $OE_1$ and a video out line $VO_1$, and so forth. For clarity, in this embodiment, the OE connections are shown connected to one edge of each chip while the VO connections are connected to the other, but it will be apparent that such connections could be made to any portion of a chip depending on a particular design of the chip. The connections such as indicated by 16 between the chip and the edge of the substrate 14 can be made, for example, using known printed-circuit techniques or any equivalent known in the art.

It will further be seen that the various OE and VO lines are connected to occupy a relatively small portion of one or another edge of the substrate 14: as shown here, the various VO and OE connections are brought in close proximity so that they may be connected to a removably-connectable socket, such as indicated generally by 18, of a design which is known in the art. Reference may be made to U.S. Pat. No. 5,528,272, referenced above, for the typical appearance of a more practical version of the present embodiment. Of course, the various OE connections and the VO connections could ultimately be connected to a single socket 18, although separate sockets 18 are here shown for clarity.

Figure 2:
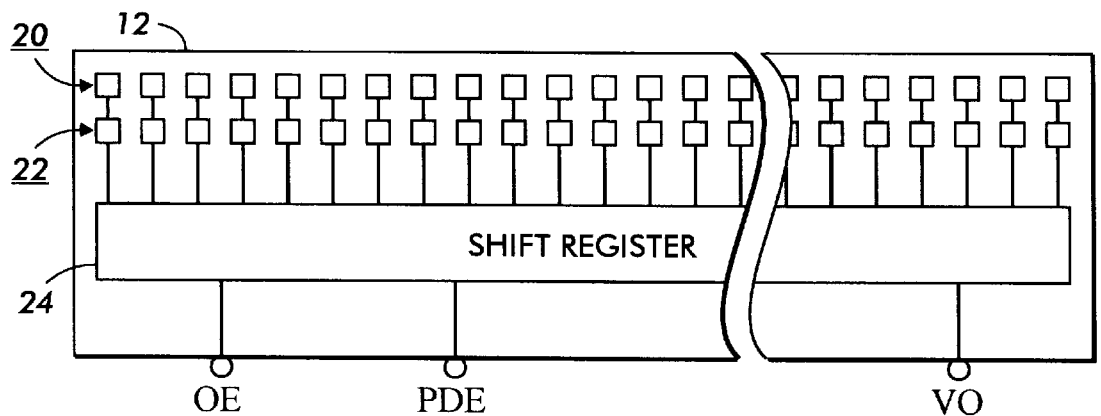
FIG. 2 is a simplified plan view showing the essential elements of a photosensor chip as would be used with the present invention.

FIG. 2 is a simplified diagram showing a typical configuration of a chip 12 as would be included on a bar such as 10. The chip 12 includes at least one row 20 of photosensors arranged in a linear array which extends substantially across the entire length of the chip. As is well known, a monochrome chip 12 will typically have only one linear array of photosensors, while a full-color version will typically have three parallel linear arrays of photosensors, each array being sensitive, such as by the inclusion of a color filter layer, to one primary color. The linear array 20 must extend essentially across the entire width of the chip 10, so that a number of chips, butted end-to-end, will form a single linear array of photosensors.

With continuing reference to FIG. 2, each photosensor in linear array 20 is connected, in this embodiment, to a transfer circuit 22, which in turn either connects to or is controlled by a shift register 24. For a more detailed implementation of a chip of this type, reference is made to U.S. Pat. No. 4,137,854 referenced above. In a CMOS-type chip, a shift register 24 is typically used to cause the transfer circuits 22 to transfer image-related charges from the photosensors 20 onto a video output line, while in a CCD-type chip, the individual cells of the shift register 24 shift the signal charges out of the chip. For purposes of the present invention, chip 12 includes an "output enable" input line OE which connects to the shift register 24 and, when activated, causes the shift register 24 to sequentially output the image-related charges on photosensors 20 to the video out line VO. Equivalents of the output enable line OE will be apparent in just about any type of photosensor chip, whether of the CMOS or CCD variety. What is important is that, when a signal is entered on to the OE line, in response thereto, the image signals are output on video out line VO. Also shown in FIG. 2 is a "pull-down enable" input PDE which is unique to one embodiment of the present invention, the specific function of which will be described in detail below.

Figure 3:
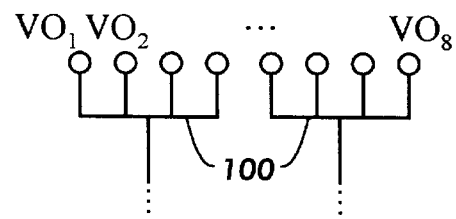
Figure 4:
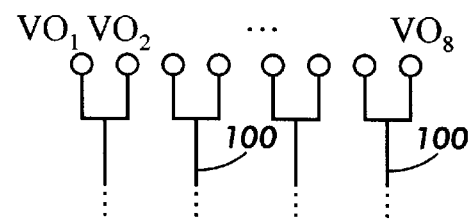

An essential feature of the bar 10 in FIG. 1 is that for each individual chip the VO and OE lines are directly accessible right off the bar 10, through one or more sockets 18. With reference to the video out lines $VO_1$, $VO_2$, . . . $VO_8$, it is physically possible for circuitry associated with these outputs to accept the video outputs of each and any individual chip 12 directly. In a practical situation, however, it would be typically more desirable to have fewer than eight parallel channels for video output. FIGS. 3–5 give examples of how the video outputs $VO_1$, $VO_2$ . . . $VO_8$ can be in effect pared down to a fewer number of lines by wiring in the form of hard-wired buses indicated as output channels 100. In FIG. 3, for example, the eight video output lines are tied together in two groups of four; in FIG. 4, the eight lines are grouped in four groups of two lines each, and in FIG. 5, a configuration which may be desirable in certain circumstances, only four lines are connected to downstream circuitry, with the outputs of the other four chips not being used at all. (Another possible configuration could be to tap the VO lines only of an evenly-distributed subset of chips 12, such as every other chip in the array.) What is significant is that the circuitry which determines how many parallel channels of video output are available can exist off the bar 10 entirely, while the bar 10 is of a generalized design which is indifferent to how many video output channels the downstream circuitry requires.

Although the various downstream circuitry configurations shown in FIGS. 3–5 are represented as hard wiring, it will be apparent to one of skill in the art that various configurations such as shown in these Figures could be achieved by, for example, providing a set of logic gates and selectively activating the gates which input signals to simulate what is shown as hard wiring.

Once it is determined specifically how many output channels are required by the downstream circuitry, such as in a digital copier or facsimile machine, the suitable outputs from video lines $VO_1$, $VO_2$ . . . $VO_8$ can be manipulated to yield the desired number of parallel channels by deliberate sequencing of signals to the output enable lines OE. FIG. 6 is a simplified diagram showing the interaction of the OE lines on a bar 10 with what is here called a "selector" indicated as 30. The selector may be ultimately related to a microprocessor or CPU, or more typically could be in the form of an ASIC suitable for this purpose. As can be seen, the selector 30 includes as outputs eight parallel lines (or rather one line for each chip in the bar 10) and can, at predetermined times, output a logic 1 to one or another output enable line OE. It can thus be seen that, by selecting the kind and sequence of parallel signals from selector 30 to the output enable lines OE, the total output of the bar 10 can be made suitable for any particular downstream circuitry, such as shown in FIGS. 3–5.

To take, first, the example of the desired two-channel output of FIG. 3, it will be apparent that the left-hand channel in FIG. 3 must, with each scan line, output in sequence the video data from chips I–VIII. Thus, by sending the logical 1 to a particular chip at a particular time in the scanning process, the selector 30 can influence exactly when video output data is output on a particular video output line VO. For the 2-channel example, with each scan line the video output must be output from chips I–IV in sequence for the left hand channel, and in sequence from chips V–VII for the right hand channel, simultaneously. Thus, for a first step in reading out video data, the selector 30 would output to the output lines OE a signal 10001000, the 1's corresponding to the OE lines for chips I and V, followed by a signal 01000100, which has its logical 1's corresponding to chips II and VI; then, 00100010 for chips III and VII, and finally 00010001, with the 1's corresponding to chips IV and VIII.

If, however, the desired output is the 4-channel output such as shown in FIG. 4, the selector 30 would output to OE lines the signal 10101010, which causes simultaneous output from chips I, III, V, and VII, followed by 01010101, causing output from the even-numbered chips. Finally, for an example such as FIG. 5, where the chips V–VIII are simply not used, the selector 30 would output signals 10000000, 01000000, 00100000, and 00010000, and then recycle directly to 10000000, leaving the chips V–VIII completely out of consideration.

As shown in the Figure, it is desirable, from the standpoint of creating a versatile design of bar 10, to have all of the OE lines for the chips accessible via a socket 18 interposed between the chips and the selector 30, so that the selector 30, which is likely to be part of a larger apparatus such as a digital copier, can directly access the OE lines of individual chips in the bar 10. The outputs from selector 30 are ultimately parallel sets of digital data, but it is conceivable that the selector 30 can access bar 10 through socket 18 via a single serial line, which would connect to the individual OE lines through a demultiplexer (not shown); with reference to the claims, use of a demultiplexer either on or off the bar 10 shall be deemed a "direct" connection between the selector 30 and the chips.

Figure 7:
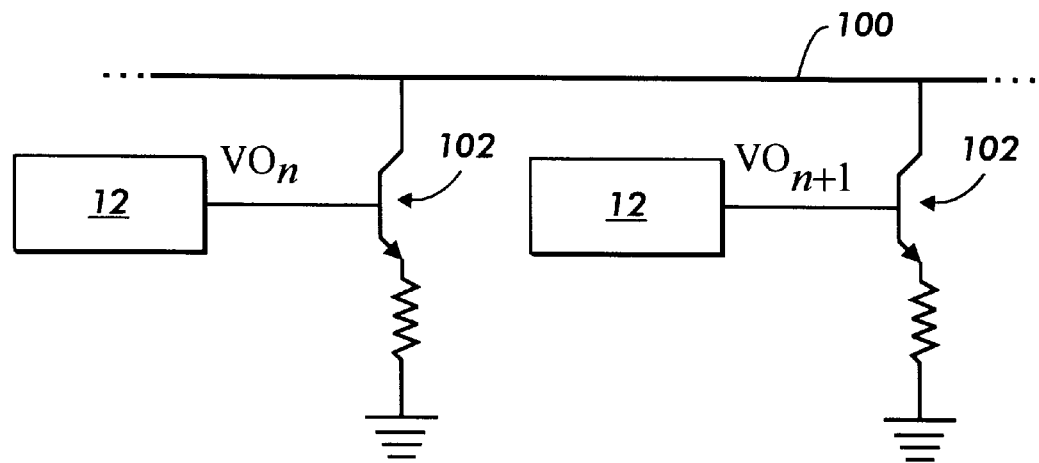
FIG. 7 is a partially-schematic view showing the relationship of two photosensor chips with an output channel.

An important practical consideration when using a plurality of video output lines VO which may be selectively connected to a shared output line, as would occur in various applications of the present invention, is the state of the video output line during intervals when a particular chip 12 is not outputting data. FIG. 7 shows an example of two chips 12, such as would be found on a bar 10, which are (through socket 18 or otherwise) tied to an output channel 100 through emitter follower transistors 102, a common configuration for tying video outputs such as $VO_n$ and $VO_{n+1}$ to an output channel such as 100. Use of emitter follower transistors, as shown, requires that the VO line of each chip be pulled down when the chip is not outputting video data; other configurations, such as direct connection of the VO line to channel 100, or use of an operational amplifier between the VO line and the channel 100, may require other kinds of properties on the VO line, such as high impedance.

In brief, with many existing designs of photosensor chips such as 12, the video output VO will be a high impedance when the chip in question is not outputting data at a particular time. It has been found that if a particular VO line is in a high impedance state, the chip provides an undesirable capacitance, such as up to 20 picofarads per chip, to the total output channel. Thus, if a large number of chips are bundled with their VO lines to a single channel, the chips which are not outputting video data at the moment will contribute undesirable capacitance to the output channel. The capacitance caused by the high impedance ultimately has the effect of slowing down the possible data rate on the output bus 100.

Figure 8:
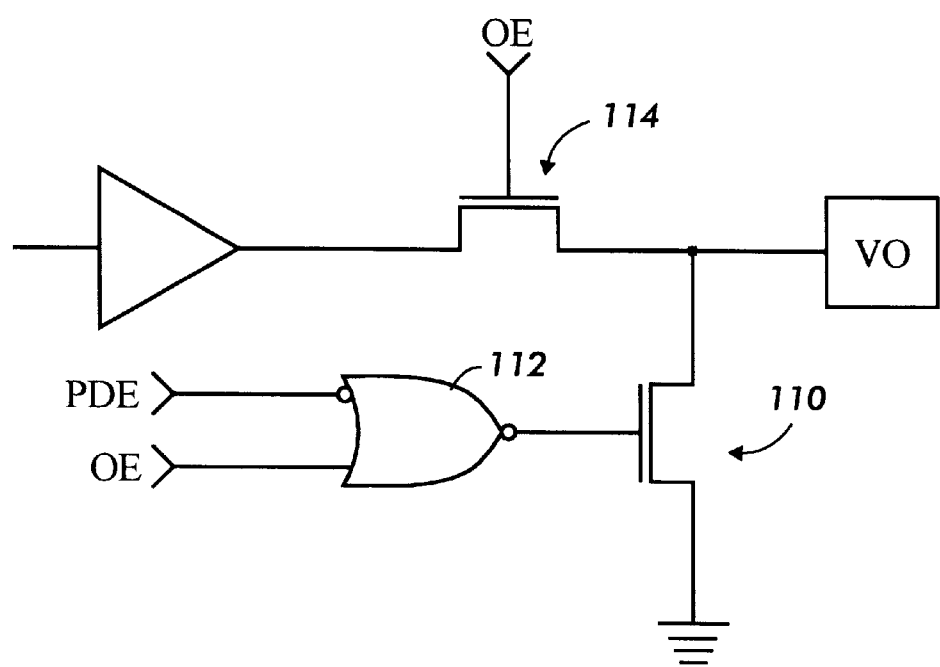
FIG. 8 is a schematic view showing circuitry associated with the video output of a chip, according to a preferred aspect of the present invention.

According to one aspect of the present invention, each chip such as 12 is provided with a selectable "pull down enable" input, or PDE, which was mentioned briefly above. The PDE is a capability associated with each chip 12 which, when activated, in effect grounds the video output line VO of a particular chip when the chip is not outputting data. FIG. 8 is a schematic diagram showing one possible configuration of a PDE line with a pad for the video output VO for a particular chip. In parallel with the pad for video output VO is a pull-down transistor 110, which is activated through a gate 112 by an externally-provided PDE signal. Another input to the gate 112 is the output enable line OE for the chip. By providing the pull down enable line PDE through the pull down resistor 110, a designer of downstream circuitry is able to select whether the video output line VO of a chip 12 should be floating or at high impedance when the chip is not outputting analog data to the channel 100. As shown by the inputs to gate 112, in this embodiment, the PDE line is in effect overridden when the OE line goes high and the chip reads out video data, so that the VO line has a predetermined impedance when the chip 12 is outputting video data.

While the invention has been described with reference to the structure disclosed, it is not confined to the details set forth, but is intended to cover such modifications or changes as may come within the scope of the following claims.

We claim:

1. An image sensor bar comprising:
   a plurality of photosensor chips, each photosensor chip including a linear array of photosensors, the photosensor chips being mounted on the image sensor bar whereby the linear arrays of the plurality of chips are aligned to form a single linear array;
   each photosensor chip including an output enable line and a video out line, activation of the output enable line causing the chip to output image signals on the video out line;
   a pull-down enable line, the pull-down enable line selectably causing the video out line of the chip to float; and
   a first socket;
   the video out line for each photosensor chip being connected directly to the first socket.

2. The bar of claim 1, the output enable line for each photosensor chip being connected directly to the first socket.

3. The bar of claim 1, further comprising
   a second socket;
   the output enable line for each photosensor chip being connected directly to the second socket.

4. An image sensor comprising:
   a plurality of photosensor chips, each photosensor chip including a linear array of photosensors, the photosensor chips being mounted on the image sensor whereby the linear arrays of the plurality of chips are aligned to form a single linear array;
   each photosensor chip including an output enable line, a pull-down enable line, and a video out line, activation of the output enable line causing the chip to output image signals on the video out line and the pull-down enable line selectably causing the video out line of the chip to float; and
   a selector, the selector being directly connected to the output enable line of each photosensor chip, and capable of activating the output enable line of a photosensor chip independently of activating the output enable line of any other photosensor chip.

5. The image sensor of claim 4, further comprising a socket operatively interposed between the selector and the plurality of photosensor chips.

6. An image sensor, comprising a photosensor;

an output line for outputting an image signal derived from light impinging on the photosensor;

a pull-down enable line, the pull-down enable line actuatable to selectably causing the output line to float.

7. The image sensor of claim 6, the pull-down enable line causing the output line to float when the output line is not outputting an image signal.

8. The image sensor of claim 7, including means for causing the output line to have a predetermined impedance when the output line is outputting an image signal.

9. The image sensor of claim 6, the pull-down enable line selectably causing the output line to have a predetermined impedance when the output line is not outputting an image signal.

10. The image sensor of claim 6, comprising a plurality of photosensors, the output line outputting a series of image signals derived from light impinging on each of the plurality of photosensors.

* * * * *